UNITED STATES PATENT OFFICE.

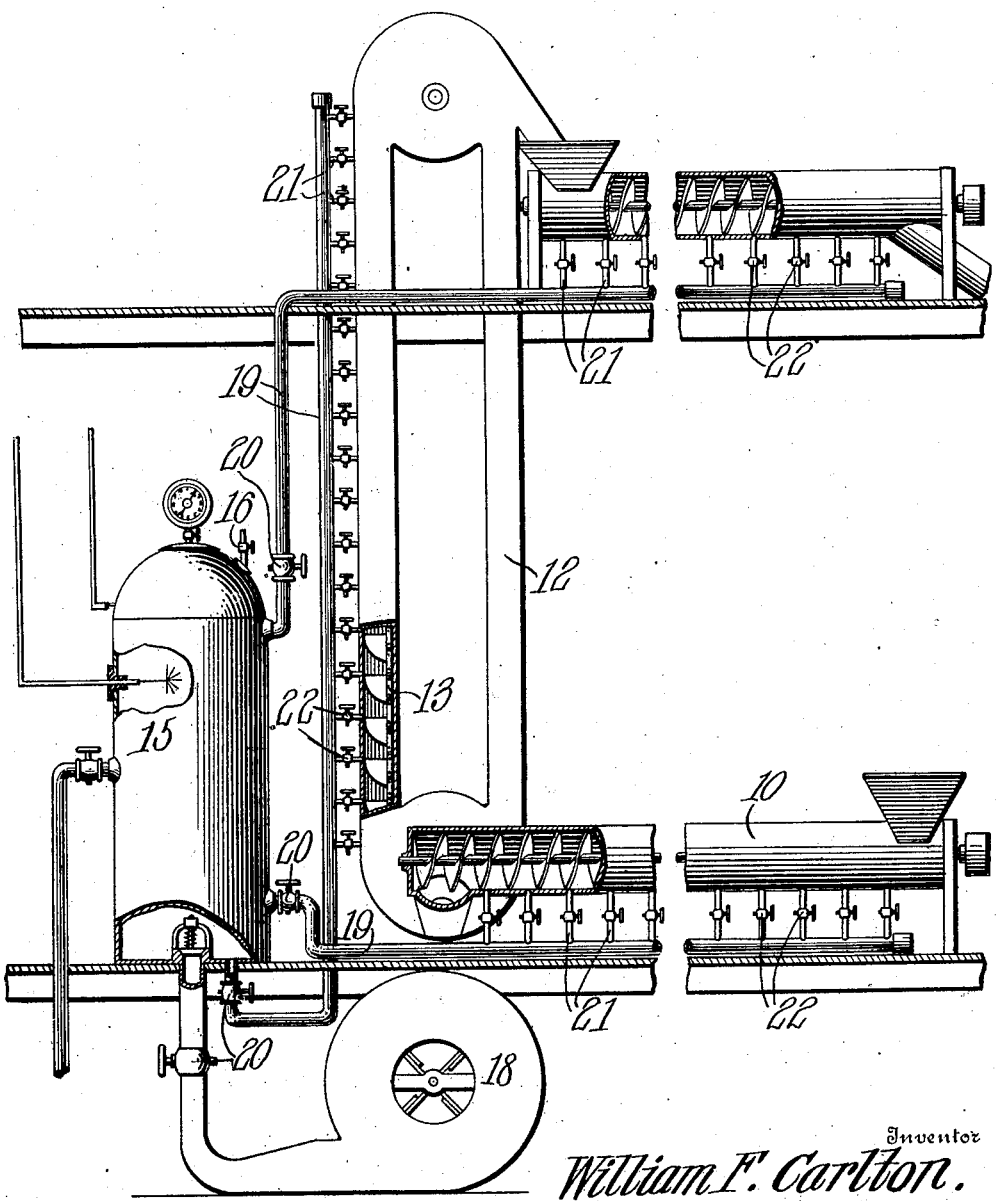

WILLIAM F. CARLTON, OF ADVANCE, MISSOURI.

APPARATUS FOR TREATING GRAIN.

No. 888,467.  Specification of Letters Patent.  Patented May 26, 1908.

Application filed September 6, 1907. Serial No. 391,661.

*To all whom it may concern:*

Be it known that I, WILLIAM F. CARLTON, a citizen of the United States, residing at Advance, in the county of Stoddard and State of Missouri, have invented a new and useful Apparatus for Treating Grain, of which the following is a specification.

This invention relates to apparatus for treating grain, and has for its principal object to provide means for the drying of the grain and the detaching of any impurities while the grain is in motion, so that the grain will be whitened, its flavor improved and the deterioration due to heating from the presence of moisture will be avoided.

A further object of the invention is to provide an apparatus of this type in which provision is made for forcing jets or blasts of dry air through the grain while the latter is in motion.

With these and other objects in view, as will more fully hereinafter appear, the invention consists in certain novel features of construction and arrangement of parts, hereinafter fully described, illustrated in the accompanying drawings, and particularly pointed out in the appended claims, it being understood that various changes in the form, proportions, size and minor details of the structure may be made without departing from the spirit or sacrificing any of the advantages of the invention.

The accompanying drawing is an elevation partly in section illustrating an apparatus constructed in accordance with the invention.

The drawing illustrates two forms of conveyer casings, the lower approximately horizontal casing 10 being arranged for the reception of a screw conveyer of any ordinary construction, and the whole or ground grain is delivered from the casing 10 to a second casing 12 which, in the present instance, is arranged vertically and the whole or ground grain is carried up through this casing by an endless conveyer 13.

At a convenient point is arranged a storage tank 15 having a safety valve 16 and air under pressure is forced into this reservoir from a suitable blast fan 18. From the reservoir lead pipes 19 in which are arranged controlling valves 20, and each of these pipes 19 is connected to a series of distributing pipes 21, each having an independent valve 22. The distributing pipes 21 are connected to the conveyer casings at equidistant intervals throughout the entire length of such casings and in such manner as to direct into said casings currents of air under any desired pressure, care being taken that the air is thoroughly dried, so that it may absorb any moisture in the grain.

The air is forced into the column of grain while the latter is in motion, and each particle of grain will travel past all of the distributing pipes and will be thoroughly dried, while any adherent foreign matter will be separated and driven off so that the grain will be thoroughly cleaned and in the case of ground grain in the form of meal and flour, the effect will be to whiten the grain, especially where the air is mingled with some bleaching agent, or, if desired, the bleaching agent may take the place of air.

I claim:—

1. In a grain treating apparatus, a conveyer casing, a conveying means therein, a series of fluid discharging pipes connected to the casing at equi-distant intervals throughout the entire length of the latter, means for forcing fluid under pressure through said pipes, and a separate controlling valve for each of the pipes.

2. In an apparatus for treating grain, a conveyer casing, a conveyer therein, a series of fluid distributing pipes connected to the casing at equi-distant intervals throughout the entire length of the latter, each of said pipes having a separate controlling valve, a fluid pressure reservoir, a main pipe extending therefrom and connected to all of the distributing pipes, and means for forcing fluid under pressure into said reservoir.

3. In grain treating apparatus, a pair of superposed conveyer casings arranged in approximately horizontal planes, screw conveyers in said casings, a vertical conveyer casing connecting the superposed casings and arranged to deliver the grain discharged from one to the entrance end of the other, an endless bucket conveyer in the vertical casing, a series of fluid supply pipes arranged parallel with the several casings, distributing pipes leading from the supply pipes and connected to the casings at equi-distant intervals throughout the entire lengths of the latter, a separate valve on each of the distributing pipes, and a fluid pressure reservoir to which all of the supply pipes are connected, substantially as described.

In testimony that I claim the foregoing as my own, I have hereto affixed my signature in the presence of two witnesses.

WILLIAM F. CARLTON.

Witnesses:
    CLARENCE SCHONHOFF,
    JOHN MATHENY.